United States Patent
Clark et al.

(10) Patent No.: US 10,411,951 B2
(45) Date of Patent: Sep. 10, 2019

(54) NETWORK POLICY CONFLICT DETECTION AND RESOLUTION

(71) Applicant: HEWLETT PACKARD ENTERPRISE DEVELOPMENT LP, Houston, TX (US)

(72) Inventors: Charles F. Clark, Roseville, CA (US);
Duane E. Mentze, Roseville, CA (US);
Shaun Wackerly, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 227 days.

(21) Appl. No.: 15/507,748

(22) PCT Filed: Feb. 10, 2015

(86) PCT No.: PCT/US2015/015122
§ 371 (c)(1),
(2) Date: Feb. 28, 2017

(87) PCT Pub. No.: WO2016/130108
PCT Pub. Date: Aug. 18, 2016

(65) Prior Publication Data
US 2017/0288952 A1    Oct. 5, 2017

(51) Int. Cl.
*G06F 11/00* (2006.01)
*H04L 12/24* (2006.01)
*G06F 11/08* (2006.01)

(52) U.S. Cl.
CPC ...... *H04L 41/0672* (2013.01); *H04L 41/0866* (2013.01); *H04L 41/0893* (2013.01); *G06F 11/08* (2013.01)

(58) Field of Classification Search
CPC .. G06F 11/08; H04L 41/0672; H04L 41/0654; H04L 41/0866; H04L 41/0873; H04L 41/0893
See application file for complete search history.

(56) References Cited

U.S. PATENT DOCUMENTS 5,889,953 A * 3/1999 Thebaut ................ G06F 21/30
709/221
6,327,618 B1 * 12/2001 Ahlstrom ............ H04L 41/0213
370/254

(Continued)

OTHER PUBLICATIONS

"Chapter 66: Configuring Dynamic Access Policies," 2010, pp. 66-1 to 66-30, 0L-20339-01, Cisco Systems, Inc.

(Continued)

*Primary Examiner* — Philip Guyton
(74) *Attorney, Agent, or Firm* — Hewlett Packard Enterprise Patent Department (57) ABSTRACT

Example implementations relate to network policy conflict detection and resolution. For example, a system for network policy conflict detection and resolution can include a policy compilation engine to compile a plurality of network policies based on an intent format, a conflict detection engine to detect a conflict between a first network policy among the plurality of network policies and a second network policy among the plurality of network policies, using the intent format, and a conflict resolution engine to resolve the detected conflict between the first network policy and the second network policy. Further, the system for network policy conflict detection and resolution can include a translation engine to translate the resolution of the detected conflict to a protocol-specific format.

11 Claims, 7 Drawing Sheets

(56) References Cited

U.S. PATENT DOCUMENTS

| | | | |
|---|---|---|---|
| 6,393,473 B1* | 5/2002 | Chu | H04L 41/0213 709/223 |
| 6,980,555 B2 | 12/2005 | Mar | |
| 7,548,967 B2 | 6/2009 | Amyot et al. | |
| 8,307,404 B2 | 11/2012 | Vinberg et al. | |
| 8,327,414 B2 | 12/2012 | Strassner et al. | |
| 2004/0177139 A1* | 9/2004 | Schuba | H04L 41/0873 709/223 |
| 2005/0044187 A1 | 2/2005 | Jhaveri et al. | |
| 2008/0126287 A1* | 5/2008 | Cox | G06N 5/02 706/48 |
| 2008/0320550 A1 | 12/2008 | Strassner et al. | |
| 2011/0321122 A1 | 12/2011 | Mwangi et al. | |
| 2012/0054163 A1* | 3/2012 | Liu | H04L 41/0873 707/694 |
| 2013/0272149 A1* | 10/2013 | Tse | H04L 43/06 370/252 |
| 2014/0331280 A1 | 11/2014 | Porras et al. | |
| 2015/0010012 A1 | 1/2015 | Koponen et al. | |
| 2016/0099883 A1* | 4/2016 | Voit | H04L 41/0873 709/226 |

OTHER PUBLICATIONS

Diego Kreutz et al., "Software-Defined Networking: A Comprehensive Survey," Jan. 31, 2015, pp. 1-61, vol. 103, Version 2.01, IEEE.
Florian Huonder "Conflict Detection and Resolution of XACML Policies," Jul. 2010, pp. 1-82, Master Thesis, University of Applied Sciences Rapperswil.
International Search Report and Written Opinion, International Application No. PCT/US2015/015122, dated Nov. 11, 2015, pp. 1-11, KIPO.

\* cited by examiner

NETWORK POLICY CONFLICT DETECTION AND RESOLUTION

BACKGROUND

Networks can include a plurality of resources connected by communication links, and can be used to connect people, provide services (e.g., internally and/or externally via the Internet and/or intranet), and/or organize information, among other activities associated with an entity. An example network can include a software-defined network (SDN).

DETAILED DESCRIPTION

Networks can include a plurality of resources such as databases and/or endpoint devices connected by communication links, and can be used to connect people, provide services (e.g., internally and/or externally via the Internet and/or intranet), and/or organize information, among other activities. Examples of endpoint devices include computers, tablets, phones, printers, cameras, door locks, HVAC controller, among other endpoint devices capable of operating on a network. An example network can include a software-defined network (SDN).

SDN controllers can direct network devices such as servers and/or computing devices on how to forward network traffic based on the input from various applications. Applications might simulate services on the network, they might be observing traffic in the network, such as with security applications, and so forth. For instance, one application can look for infected hosts on the network, while another application may attempt to optimize voice over internet protocol (VoIP) calls on the network. Both applications may run on the same SDN controller, and use the SDN controller to communicate down to network devices in a native format. As used herein, a native format refers to a data format specific to a particular application. A native format can also be referred to as a protocol-specific format.

When applications within a network, such as an SDN, want to tell the same devices in the network what to do, a conflict may arise and in some cases, neither application may be permitted to instruct the devices. Further, as both applications may communicate with the devices using native protocols, additional difficulty may result in executing the actions of the protocols. In such instances, the SDN controller may be unable to determine which actions from which applications should be executed, and/or if the actions of both applications should be executed.

Also, network policies may be applied within the network, such as an SDN, and may be applied by particular protocols such as Access Control Lists (ACLs) and/or OpenFlow. These policies can be codified into the protocol-specific format, then input to an individual network component or a SDN controller. As used herein, a policy can refer to a set of match criteria with an accompanying action which should be taken on matching network traffic. When the policy space (e.g., set of matching network packets) of two policies overlaps, a network administrator may be left to decide which policy should be applied to the overlapping space. The overlapping policy which is not selected by the network administrator is either left unapplied for the overlapped policy space or is rejected entirely. Further, when an SDN controller is used, the SDN controller may automatically perform the policy selection task that was above performed by a network administrator. The network controller may then coordinate between policy requests from various applications and provide information to those applications about whether or not their policies have been applied. In some cases, the applications are neither aware of each other nor are they capable of coordinating to resolve policy conflicts. For example, if a network administrator has two policies, one to monitor traffic from suspicious hosts, and one to optimize traffic for VoIP phone calls, then the administrator may have to select whether traffic monitoring or optimization of VoIP phone calls is higher priority.

In contrast examples herein relate to network policy conflict detection and resolution. Network policy conflict detection and resolution, in accordance with the present disclosure, can allow for detection of conflicts between network policies expressed in an intent format, resolution of the detected conflicts, and then translation of the resolved conflict into a protocol-specific format.

Figure 1:
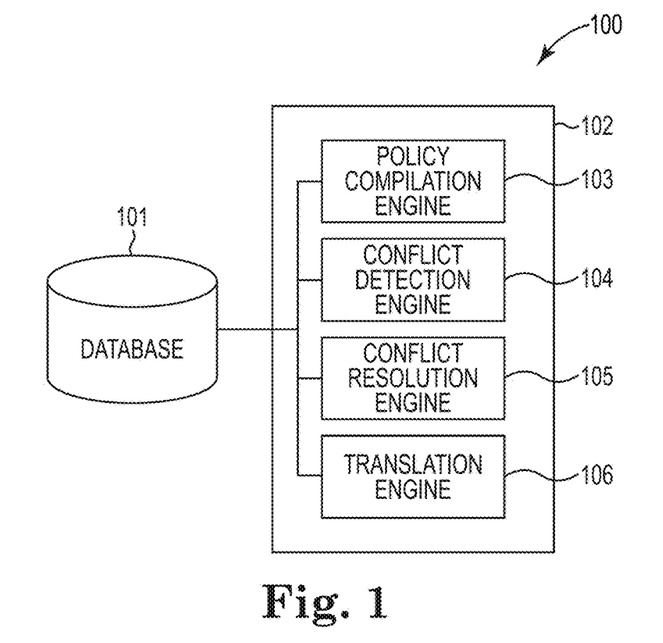
FIG. 1 illustrates a diagram of an example of a system according to the present disclosure.
Figure 2:
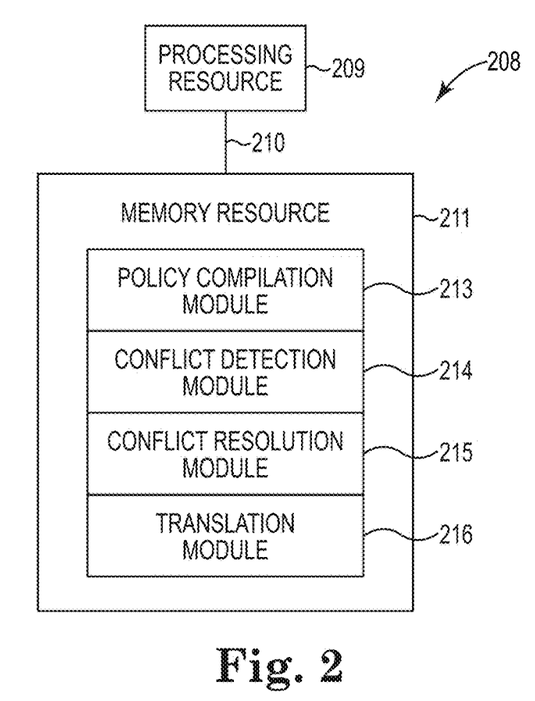
FIG. 2 illustrates a diagram of an example computing device according to the present disclosure.

FIGS. 1 and 2 illustrate examples of systems 100, 208 according to the present disclosure. That is, FIG. 1 illustrates a diagram of an example of a system 100 according to the disclosure. The system 100 can include a database 101, a subsystem 102, and/or a number of engines 103, 104, 105, 106. The subsystem can include the number of engines in communication with the database 101 via a communication link. The system 100 can include additional or fewer engines than illustrated to perform the various functions described herein. The system can represent instructions and/or hardware of a network controller (e.g., system 208 as referenced in FIG. 2, etc.).

The number of engines 103, 104, 105, 106 can include a combination of hardware and programming to perform functions including those described herein (e.g., detect a change in a first registered attribute to a second registered attribute, etc.). The instructions can include instructions (e.g., software, firmware, etc.) stored in a memory resource (e.g., computer readable medium (CRM), machine readable medium (MRM), etc.) as well as hard-wired program (e.g., logic).

The policy compilation engine 103 can include hardware and/or a combination of hardware and instructions to compile a plurality of network policies based on an intent format. In accordance with examples of the present disclosure, policies can be expressed via an intent format by applications, rather than a native format like ACLs and/or Open- Flow. As used herein, an intent format refers to an expression of a network policy, defined by a classifier of network traffic, a context of the network traffic, an action to be taken on the network traffic, a network traffic source endpoint identifier, and a network traffic destination endpoint identifier, as discussed further herein. In other words, each network policy can have a classifier, context, action, source endpoint identifier and destination endpoint identifier which collectively define the intent format of the network policy. An ACL, as used herein, can refer to a list of permissions that are used for filtering traffic based on a given filtering criteria on a router or switch interface. Examples of conditions supplied by the ACL, can include allow, block, and/or remark differentiated services code point (DSCP). OpenFlow, as used herein, can refer to a communication protocol that gives access to a data plane of a network (e.g., an SDN). OpenFlow can perform a plurality of actions within the network, such as enable remote controllers (e.g., SDN controllers) to determine the path of network packets through a network of switches, classify network traffic, and apply network policy actions, among other actions.

To compile the plurality of network policies, an administrator may define the network policies, using the policy compilation engine 103, and through some special application such as a graphical user interface (GUI) or scriptable interface. For instance, the administrator may define a classifier, a context, various actions, and source and/or destination endpoint identifiers for a particular network policy.

The policy compilation engine 103 may be flexible and may support a plurality of possible action types. Each action type may be defined, such as before policy compilation, with the following criteria for that action type: First, is the action composable? Meaning, can the action be composed and/or combined with other actions? Second, is the action an observer? Meaning, does the action modify the packet of network traffic, or does the action leave the packet unmodified? Third, does the action allow duplicates? Meaning, can two actions of the same type be performed on the same packet? For instance, two 'redirect' actions may not be executed on the same packet, but two latency settings may be enforced on the same packet since one latency setting may guarantee the other. Fourth, what is the action precedence? Meaning, what is the priority of the action relative to other actions, for resolving conflicts?

As used herein, a classifier can refer to a particular type of network traffic, a particular type of device to and/or from which the network traffic is routed, and/or any other type of identifier which can categorize traffic within the network. For instance, a classifier can include a combination of logical expressions involving an IP protocol, an ethernet type, an L4 source port, among other types of expressions. If the particular classifier "matches" network traffic, the network traffic includes a property that is defined by the classifier of the network policy. In some examples, the classifier of the network policy can be a collection of expressions (e.g., logical expressions). In such examples, if any expression in the collection of expressions matches the network traffic, the entire classifier can be a match. For instance, an administrator of a network, can specify a network policy that has a classifier of "user datagram protocol (UDP) and port 67". In such an instance, the classifier is specifying that the policy relates to any UDP traffic that is also for port 67, and the classifier of "UDP and port 67" may be referred to as an expression. An example of a collection of expressions can include "UDP source port 67 or transmission control protocol (TCP) port 59", where each of the phrases "UDP port 67" and "TCP port 59" can be an example of an expression. When any packet of traffic within the network includes "UDP port 67" or "TOP port 59", then the packet of traffic is considered to "match" the classifier.

In another example, the classifier of the network policy can be a collection of terms. In such an example, if all terms in the expression match the network traffic, the entire expression can be a match. For instance, an administrator of the network can specify a classifier having a collection of terms such as, "UDP source port 67, destination port 71", and the network traffic would have to match each of the terms in the classifier to be considered a match.

In yet another example, the classifier of the network policy can be a collection of terms, and each term can be a collection of single values and intervals. For instance, an administrator of the network can specify a classifier having a collection of terms such as, "UDP source port 67 and destination port", and values representing the destination port can be provided, such as 68, 69, and 71. If data in the network traffic falls within any interval or matches any single value, the entire term can be a match.

As used herein, a context of network traffic can refer to a global condition or a plurality of global conditions during which the network policy should apply. A context of network traffic can be a time of day, and/or a system state among other conditions. For example, a context of network traffic can state that between the hours of 5 pm and 7 am, all endpoint devices within the network should take a particular action. In another example, a context of network traffic can state that when the network is under a malicious security attack, all endpoint devices are prohibited from taking particular actions.

As used herein, a source endpoint identifier refers to a numerical, alpha, and/or alpha numerical value that identifies a source of network traffic and/or a group of sources of network traffic. A source endpoint identifier can refer to more than a single source. For example, a source endpoint identifier can be a range of internet protocol (IP) addresses, or all employee endpoints. Similarly, a destination endpoint identifier refers to a numerical, alpha, and/or alpha numerical value that identifies a destination endpoint of the network traffic and/or a group of destination endpoints of network traffic. Further, a destination endpoint identifier can refer to more than a single destination. For example, a destination endpoint identifier can be a range of IP addresses, or all employee endpoints. Both source endpoint identifiers and destination endpoint identifiers can identify particular devices within the network, as well as particular users within network. For example, a source endpoint identifier and/or a destination endpoint identifier can specify that the policy pertains to all employees within the network. Similarly, a source endpoint identifier and/or an destination endpoint identifier can specify that the policy pertains to any employees that share a common trait, such as, being in a particular physical location. In another example, a source endpoint identifier and/or an destination endpoint identifier can specify that the network policy pertains to only employees, and/or only non-infected hosts within the network. While examples are provided herein, describing source endpoint and destination endpoint identifiers, examples are not so limited, and other identifiers can be provided that identify the group and/or groups to which a network policy applies.

As used herein, a network action refers to a resulting action or resulting actions which should be applied to all traffic within the policy space of the network policy. For instance, a specific packet on the network is within the policy space of the network policy if the packet matches the classifier, is from an source in the source group(s), is to an endpoint in the endpoint group(s), and the packet occurs during the conditions specified by the context.

As used herein, an action refers to actions and/or treatments to be applied to network communication between destination groups. Example actions can include: allow, redirect, inject, inspect, audit, log, latency, bandwidth, loss, and block, among other actions. The action "allow" refers to a command that permits communication between destination groups. The action "redirect" refers to a command to encapsulate and send the packet to a particular service, as an alternate destination. The action "inject" refers to a command to insert a new packet and forward it onto the network. The action "inspect" refers to a command to encapsulate and send the packet through a service chain, on its way to the final destination. The action "audit" refers to a command to send encapsulated copies of the packet to a particular service. The action "log" refers to a command to collect statistics on a particular section of network traffic. The action "latency" refers to a command to deliver the network packet and/or network packets after a specified delay period. The action "bandwidth" refers to a command to limit the rate of communication within the network to within a specified bandwidth. The action "loss" refers to a command to allow only a specified portion of the traffic to be lost. Additionally, the action "block" refers to a command to deny a particular communication within the network.

In some examples, the policy compilation engine 103 can specify whether each of the network policies are exclusive or not, referring to whether or not the network policy can be enforced and/or applied in combination with other policies. Each application within the network can specify whether a particular policy executed by the application can be enforced in combination with other policies, or if the network policy must be applied by itself. For example, a network security application might specify that a particular security policy can be applied with other policies, such as policies enforced by a Voice Over IP (VoIP) application. The exclusivity designation for each policy can be used by a conflict detection engine 104 and/or a conflict resolution engine 105, discussed further herein, to detect and resolve conflicts between network policies.

Additionally, in some examples, the policy compilation engine 103 can specify an application priority. An application priority can be a list specifying an order with which particular network policies should be applied. For instance, an administrator of the network can define an application priority, specifying an order of each application within the network, and which can be used to order the applications relative to one another. Similarly, each application can specify a network policy priority, which can be used to order the network policies of the particular application relative to other network policies for that particular application. The application priorities and policy priorities can be used by a conflict detection engine 104 and/or a conflict resolution engine 105 to resolve a conflict between network policies, as discussed further herein.

The conflict detection engine 104 can include hardware and/or a combination of hardware and instructions to detect a conflict between a first network policy among the plurality of network policies and a second network policy among the plurality of network policies, using the intent format. For instance, the classifier, context, action, source endpoint identifier, and/or destination endpoint identifier for each network policy can be compared against every other network policy, to determine if any policies have a similar intent format.

In an example, the policy space of the first network policy can be compared to the policy space of the second network policy space, in order to identify packets of network traffic that would be affected by both policies. In other words, the conflict detection engine can compare the first network policy space to the second network policy space and identify if the first and second network policy spaces overlap. As used herein, an "overlap" between network policies refers to at least two policies that would apply to a particular packet within the network traffic. For instance, a classifier for one policy (e.g., "policy A") can be "VLAN 5" and a classifier for another policy (e.g., "policy B") can be "port 6". In such an example, an overlap between policy A and policy B can exist when network traffic is going to and/or from both VLAN 5 and port 6. While the phrases "first" and "second" are used herein to denote different network policies, these designations are not intended to refer to any particular order, such as an order in time.

While examples are provided herein, describing comparing a first network policy to a second network policy, examples are not so limited. For example, the conflict detection engine 104 can compare the first network policy against all other network policies to identify overlapping policies, as described further in relation to FIG. 4.

Figure 4:
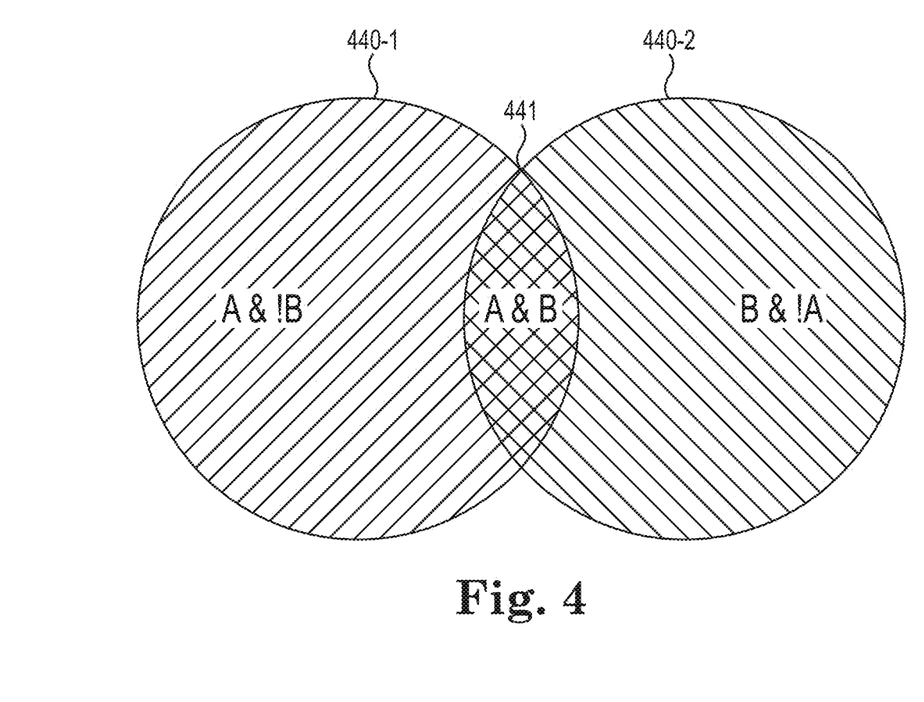
FIG. 4 illustrates an example of overlapping network policy spaces and orthogonal network policies, according to the present disclosure.

The system 100 can also include a conflict resolution engine 105 to resolve the detected conflict between the first network policy and the second network policy, as discussed further in relation to FIG. 4. Furthermore, the system 100 can include a translation engine 106 to translate the resolution of the detected conflict to a protocol-specific format, as discussed further herein.

FIG. 2 illustrates a diagram of an example computing device 208 according to the present disclosure. The computing device 208 can utilize instructions (e.g., software and/or firmware) hardware, and/or logic to perform a number of functions including those described herein. The computing device 208 can be a combination of hardware and program instructions configured to share information. The hardware, for example, can include a processing resource 209 and/or a memory resource 211 (e.g., CRM, MRM, database, etc.).

A processing resource 209, as used herein, can include a processor capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., resolve a detected conflict between a first network policy and a second network policy).

The memory resource 211 can be in communication with a processing resource 209. A memory resource 211, as used herein, can include memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A module and/or modules 213, 214, 215, 216 can include CRI that when executed by the processing resource 209 can perform a number of functions including those described herein. The number of modules 213, 214, 215, 216 can be sub-modules of other modules. For example, the policy compilation module 213 and conflict detection module 215 can be sub-modules and/or contained within the same computing device. In another example, the number of modules 213, 214, 215, 216 can comprise individual modules at separate and distinct locations (e.g., CRM, etc.).

Each of the number of modules 213, 214, 215, 216 can include instructions that when executed by the processing resource 209 can function as a corresponding engine as described herein. For example, the policy compilation module 213 can include instructions that when executed by the processing resource 209 can function as the policy compilation engine 103. In another example, the conflict detection module 214 can include instructions that when executed by the processing resource 209 can function as the conflict detection engine 104.

The policy compilation module 213 can include instructions that when executed by the processing resource can compile a plurality of network policies based on an intent format, as discussed in relation to FIG. 1. In various examples, the conflict detection module 214 can include instructions that when executed by the processing resource can detect a conflict between a first network policy among the plurality of network policies and a second network policy among the plurality of network policies, using the intent format. The conflict resolution module 215 can separate conflicting policies into a plurality of non-conflicting policies, and resolve the detected conflict based on the plurality of non-conflicting policies. The translation module 216 can include instructions that when executed by the processing resource can translate the resolution of the detected conflict into a protocol-specific format.

In some examples, the system 100 and or the computing device 208 can include a policy optimization engine and/or a policy optimization module (not illustrated). The policy optimization engine and/or module can include hardware, instructions executable by a processing resource, and/or a combination of hardware and instructions to optimize a plurality of policies.

With a set of N possibly overlapping network policies, the following may be used to derive a complete set of N+ orthogonal network policies to perform the functions of the overlapping network policies:

```
Set<Policy> getOrthogonalPolicies(Set<Policy> policies) {
    while (splitOverlappingPolicy(policies))
        ; // call until no splits occur
    return policies;
}
boolean splitOverlappingPolicy(Set<Policy> policies) {
    // Iterate over all policies in the set.
    // Replace the first overlap with orthogonal policies.
    Set<Policy> all = policies.deepCopy( );
```

```
    for (Policy p1 : all) {
        // Remove p1 from the set we'll analyze
        all.remove(p1);
        // Check for overlap between p1 and the remainder of the set
        For (Policy p2 : all) {
            if (policiesOverlap(p1,p2)) {
                // Remove the two original policies from the set
                policies.remove(p1);
                policies.remove(p2);
                // Replace original policies with 3+ orthogonal policies
                policies.addAll( splitPolicies(p1,p2) );
                return true;
            }
        }
    }
    // No overlaps were found
    return false;
}
```

In some examples, the set of orthogonal policies returned from getOrthogonalPolicies( ) above, may be optimized using an optimization engine and/or an optimization module. If any orthogonal policies which have an empty set of source endpoint identifiers or destination endpoint identifiers, those orthogonal policies may be removed, because such orthogonal policies are effectively not applicable to anything in the network. The reduced set may be functionally equivalent because such policies do not match any sources or destinations.

Additionally and/or alternatively, the optimization engine and/or optimization module can construct a default network policy to implement at a lowest priority. As used herein, a default network policy can refer to a network policy that matches all possible packets of network traffic and is therefore non-orthogonal. Such a default network policy would include the policy space for every orthogonal network policy in its own policy space, but the default network policy would specify a default behavior for network traffic which does not match any network policy. The optimization engine and/or module could remove any orthogonal policies whose actions exactly match the default network policy, given that such policies would be redundant. In some examples, the default network policy would specific an action such as 'block' or 'allow'.

Further, some conditions may exist where the source or destination endpoint identifier may be wholly represented by a packet classification. In such a case, the source or destination endpoint identifier could be changed within the orthogonal network policy to indicate 'all' endpoints and additional criterion could be added to the classifier. This mechanism retains the same policy space, but shifts the matching criterion from one component of the policy space, such as source or destination endpoint identifier, to another such as classifier. One example of this optimization would be to replace the set of all source endpoint identifiers on VLAN X with an additional classifier expression which includes VLAN X as matching criteria.

Network policy optimization can reduce the number of protocol-specific messages generated. For instance, if there are 100 destination endpoint identifiers on VLAN 5 and all 100 destinations are specified as match criterion in an orthogonal network policy's destination endpoint identifier, the orthogonal network policy could be modified to have 'all' as the destination endpoint identifier and VLAN=5 as part of the classifier. When such an orthogonal network policy is translated (e.g., using the translation engine 106 and/or the translation module 216) to a protocol specific format such as OpenFlow, optimization could reduce the number of protocol-specific messages from 100 (e.g., one protocol-specific message to match each destination endpoint identifier) to one (e.g., one protocol-specific message to match all destinations on VLAN 5).

The translation module 216 can include instructions that when executed by the processing resource can translate the resolution of the detected conflict to a protocol-specific format. Using the translation engine 106 and/or the translation module 216, the optimized set of orthogonal policies may be translated such that each orthogonal network policy may be translated into at least one protocol-specific message, which may be communicated to relevant network devices for enforcement. Examples of such translated messages are an OpenFlow flow-mod message or a simple network management protocol (SNMP) request to add an ACL.

In some examples, using the translation engine 106 and/or the translation module 216, each protocol-specific message may be marked with an identifier which provides a way of identifying the orthogonal network policy which was translated into the protocol-specific message. Network devices may provide statistics on a per-protocol-message basis, such as hit counters on an ACL, and these statistics may be combined and tallied for each original network policy represented in the protocol-specific message.

The translation engine 106 and/or the translation module 216 may be pluggable and may support multiple simultaneous translations. In other words, the same set of orthogonal network policies may be handed to multiple translation engines 106 and/or translation modules 216 (one for each southbound protocol).

In some examples, the system 100 and/or the computing device 208 can include a protocol selection engine and/or a protocol selection module (not illustrated). Depending upon the capabilities of the devices in the network, the network policy engine could perform protocol selection on a per-device basis. For instance, an SDN controller (e.g., running a policy engine) could manage two devices, device A with a large ACL table and device B with a large OpenFlow table. In such an example, the SDN controller could translate into the ACL format for device A and OpenFlow for device B. If the table consumption within those devices changed, the policy selection engine could select an alternate protocol-specific format to use. In some cases where an ordering pipeline between protocols is known by the policy selection engine, the set of orthogonal policies could be distributed across multiple protocols to maximize table usage, such as if the default network policy is 'allow'.

Further, where a network device's table capacity is exceeded by the protocol-specific messages received, the translation engine 106 and/or the translation module 216 can record information about each original network policy which could not be fully applied. The translation engine 106 and/or the translation module 216 may also operate with the conflict resolution engine 105 and/or the conflict resolution module 215 and use application priority or network policy priority to determine which orthogonal policies should be enforced by the limited capacity table. For instance, if network policy translation produced 3000 OpenFlow rules but the network device's OpenFlow table was 2000 in size, the translation engine 106 and/or the translation module 216 could choose which 1000 OpenFlow rules would not be enforced directly in the OpenFlow table.

Figure 3:
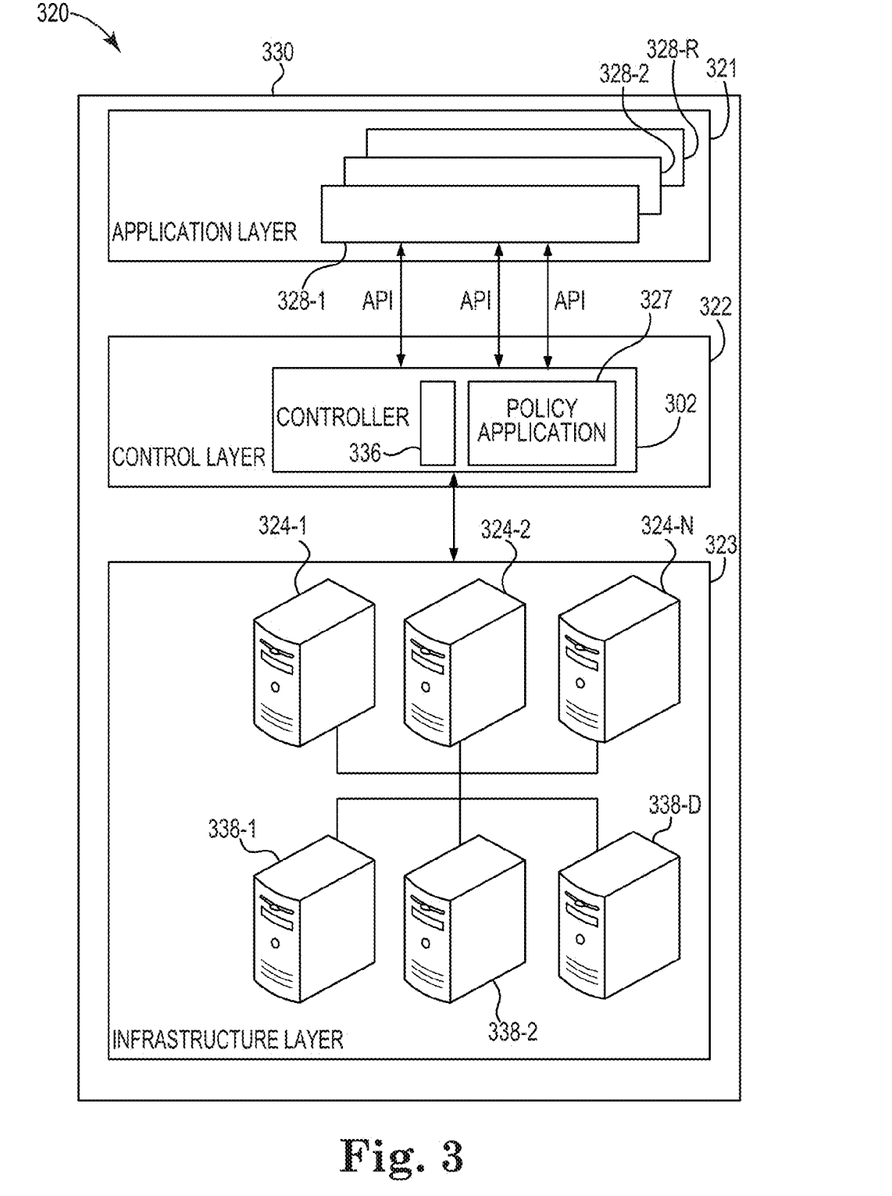
FIG. 3 illustrates an environment for network policy conflict detection and resolution according to the present disclosure.

FIG. 3 illustrates an environment 320 according to the present disclosure. The environment 320 can include a client-server network (e.g., a cloud network) 330 that allows endpoint devices 338-1, 338-2, 338-D (e.g., thin clients, portable computers, smartphones, desktop computers, etc.) to access a pool of hosted computing and/or storage resources (e.g., the cloud resources) and virtual network services over a physical network (e.g., a private intranet and/or the public Internet). While illustrated as included in the client-server network 330 it is understood that the endpoint devices 338-1, 338-2, 338-D are on the network 330 and coupled thereto although endpoint devices 338-1, 338-2, 338-D regardless of a physical location of the endpoint devices. Examples, the client-server network 330 can include an SDN-enabled network (e.g., a network that can be managed as an SDN). That is, the environment 320 can include an SDN enabled client-server network (e.g., an SDN). An SDN can include a form of cloud virtualization in which a control layer 322 (e.g., a subsystem that makes decisions that affect cloud traffic) is separated from an infrastructure layer 323 and is implemented as instructions. The control layer 322 can define how cloud traffic is handled in a number of devices.

As illustrated in FIG. 3, the environment 320 can include an application layer 321, a control layer 322, and/or an infrastructure layer 323 in the network 330 (e.g., in the SDN). The application layer 321 can include a number of applications (e.g., programs) 328-1, 328-2, ..., 328-R that communicate cloud operating specifications and/or desired cloud behavior to the control layer 322. Applications in the application layer 321 can be implemented by the controller 302 and/or be implemented by other computing devices that interface with controller 302. The application layer 321 can communicate with the control layer 322 via an application instructions interface (API). An API can include a set of routines, protocols, and/or tools that accomplish a specific task and/or are allowed to interact with a specific software component.

The control layer 322 can translate operating specifications provided by the application layer 321 to the infrastructure layer 323. Further, the control layer 322 can include a controller (e.g., an SDN controller) 302 to communicate between the application layer 321 and the infrastructure layer 323. The SDN controller 302 can be hardware and/or instructions. A hardware SDN controller 302 can include a processing resource in communication with a memory resource. The memory resource can include instructions, executable by the processing resource to perform a number of functions described herein. In some examples, the SDN controller 302 can be a discrete device, such as a server.

Also, as illustrated in FIG. 3, the environment 320 can include a network policy application 327 and/or other application 336 embedded in the controller 302, (or implemented by one or more other computing devices interfacing with controller 302), and a number of servers 324-1, 324-2, ..., 324-N (referred to herein as servers 324). The infrastructure layer may include various network devices, such as switches, routers, bridges, wireless access points, and the like, for connecting the servers 324 together in a network. The network policy application 327 can include hardware and/or instructions to compile network policies based on an intent format, detect conflicts between network policies, resolve conflicts between network policies, and translate the resolution of detected conflicts to a protocol-specific format, for instance, using engines 103, 104, 105, 106 illustrated in FIG. 1 and/or modules 213, 214, 215, 216 illustrated in FIG. 2.

Each of the number of servers 324 can include a number of agents. As used herein, an agent refers to a component of a server that relays messages between the controller 302 and the server and performs a specific network service. For example, each of the number of servers 324 can include an agent that performs the services of at least one of an IP address agent, a switching agent, and/or a routing agent. Multiple instances of these agents could be running on each server, however, each agent can be connected to only one controller 302.

FIG. 4 illustrates an example of overlapping network policy spaces and orthogonal network policies, according to the present disclosure. In FIG. 4, policy 440-1 and policy 440-2 are illustrated as having an overlapping space 441. Put another way, policy 440-1 and 440-2, as illustrated in FIG. 4, has an overlap in application, in that at least part of policies 440-1 and 440-2 would apply to the same network traffic. For instance, using the intent format, it may be determined that the context of policy 440-1 overlaps with the context of policy 440-2, such as both policy 440-1 and policy 440-2 apply to network traffic on Sundays.

As illustrated in FIG. 4, policy 440-1 and policy 440-2 have overlapping space 441, where both policy 440-1 and policy 440-2 could apply to network traffic. For instance, policy 440-1 may apply to "VLAN 5" and policy 440-2 may apply to "port 6". The overlapping space 441 may refer to the fact that both policy 440-1 and policy 440-2 may apply to network traffic that is going to and/or from both VLAN 5 and port 6. Policies may be considered to be in conflict if they may not both be applied simultaneously to any single packet in the policy space where they overlap. For instance, policy 440-1 and policy 440-2 may be considered to be in conflict if they may not both be applied simultaneously to any single packet in overlapping space 441.

To resolve a conflict between network policies, the overlapping network policies may be divided into a plurality of orthogonal policies. Put another way, in response to detecting an overlap in application between a first network policy and a second network policy, the conflict detection engine 104 and/or the conflict resolution engine 105 can separate the overlapping first network policy and second network policy into a plurality of orthogonal policies. As used herein, an orthogonal network policy refers to a network policy which has a policy space which does not overlap with any other orthogonal network policy. Also, a policy space can include a set of source endpoint identifiers, a set of destination endpoint identifiers, a classifier, and a context. Two network policies can be orthogonal if there are no possible packets which would apply to both network policies.

Referring to FIG. 4, network policy 440-1 can be referred to as "Policy A", and network policy 440-2 can be referred to as "Policy B". The overlap between policy A and policy B can be converted into three orthogonal policies, as depicted in FIG. 4. For example, overlapping policies A and B (e.g., policies 440-1 and 440-2, respectively) could be converted to 3 orthogonal policy spaces, A&!B, A&B, and B&!A. As used herein, the nomenclature of "A&!B" means "A and not B". Similarly, "A&B" means "A and B", and "B&!A" means "B and not A". As such, in policy space A&!B, policy A (e.g., 440-1) would be enforced, and not policy B (e.g., 440-2), in policy space A&B, policy A and policy B would be enforced, and in policy space B&!A, policy B would be enforced and not policy A. That is, each of the plurality of orthogonal policies would be classified as one of the following: an orthogonal network policy from the non-overlapping portion of policy A (e.g., A&!B), an orthogonal network policy from the non-overlapping portion of policy B (e.g., B&!A), or an orthogonal network policy from the overlap 441 between policy A and policy B (e.g., A&B).

As discussed previously herein, a policy may be defined by an intent format, comprising 4 separate criterions: a classifier, a context, a source endpoint identifier, and a destination endpoint identifier. As such, the overlapping space 441 may be separated into orthogonal network policies in 4 separate dimensions. For instance, network policy 440-1 and 440-2 can be separated into a plurality of orthogonal network policies, based on each of the classifier, the context, the source endpoint identifier, and the destination endpoint identifier for each network policy 440-1 and 440-2. Put another way, reducing 2 policies (e.g., policy 440-1 and policy 440-2) to a set of orthogonal policies may produce between 2 and $3^4$ (e.g., 81) orthogonal network policies. 2 orthogonal network policies may be produced if there is no overlap between policies 440-1 and 440-2, such as if overlap 441 did not exist. $3^4$ orthogonal network policies may be produced by a partial overlap in each of the 4 dimensions of the network policies 440-1 and 440-2.

In each orthogonal policy space, an action and/or actions may be associated with the orthogonal policy space. For instance, referring to FIG. 4, policy 440-1 (e.g., policy A) may have an action "audit" and policy 440-2 (e.g., policy B) may have an action "block". Network traffic in the policy space A&!B would have an action "audit", and network traffic in the policy space B&!A would have an action "block". Similarly, network traffic in the policy space A&B would have an action "audit and block". Put another way, policy space A&B may get the action from A and the action from B.

In some examples, an orthogonal network policy may contain a conflict. For instance, in orthogonal policy space A&B, it may not be possible to execute both policy A and policy B. In such instances, the conflict between policies can be resolved by policy priority. Each policy may be generated by a respective application within the network. For instance, an application such as a network security application may generate a plurality of policies, and a VOIP may generate a plurality of policies. The network security application may assign a priority to each of the policies it has generated, and the VOIP may assign a priority to each of the policies it has generated. Similarly, an administrator of the network may assign a priority to each of the applications within the network. For instance, the administrator may assign a higher priority to the network security application than to the VOIP. In such a manner, a conflict between network policies may be resolved by comparing the priority assigned to one network policy to the priority assigned to the other network policy, and applying the network policy with the higher priority. As used herein, a policy with a higher priority refers to a policy that has a priority with a greater numerical value relative to another policy, and/or a priority that has a greater importance to the network relative to another policy.

Figure 5:
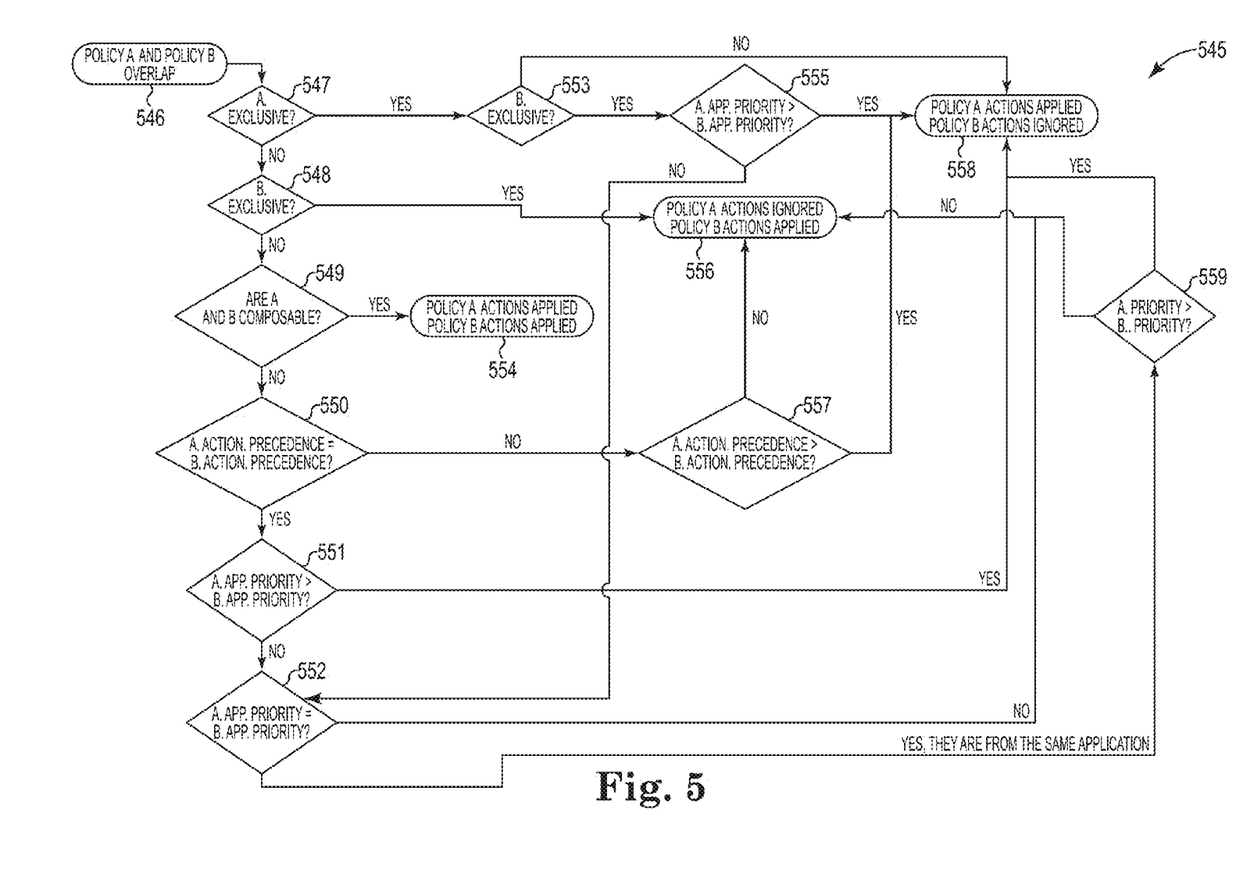
FIG. 5 illustrates a flow chart of an example method for network policy conflict detection and resolution according to the present disclosure.

FIG. 5 illustrates a flow chart of an example method 545 for network policy conflict detection and resolution, according to the present disclosure. The method 545 in FIG. 5 illustrates how an action set which applies to policy space A&B (e.g., overlap 441 illustrated in FIG. 4) could be derived. The various determinations described in FIG. 5 can be executed and/or performed by the conflict resolution engine 105 illustrated in FIG. 1 and/or the conflict resolution module 215 illustrated in FIG. 2. As described in relation to FIG. 4, the action set which would apply to policy space A&!B may be inherited from network policy A, and the action set which would apply to policy space B&!A may be inherited from network policy B. In an example where network policy A conflicts with network policy B, the policy space A&B may enforce the actions from the winner of the network policy conflict. If network policy A overlaps with network policy B but does not conflict, the policy space A&B may enforce the actions from both network policy A and network policy B.

At 546, the method 545 can include determining if policy A and policy B overlap in application in an SDN network. For instance, using the conflict detection engine 104 and/or the conflict detection module 214 (illustrated in FIGS. 1 and 2, respectively), an overlap can be detected between a first policy and a second policy, such as policies 440-1 and 440-2 illustrated in FIG. 4, such that both policies would apply to network traffic in an SDN, such as network 330 illustrated in FIG. 3.

In response to determining that policy A and policy B overlap in application, at 547 and 548, the method 545 can include determining if policy A and policy B are exclusive. As described further herein, an exclusive policy can refer to a policy which may not be enforced with other policies. As such, the method 545 can include determining if policy A can be enforced with policy B. If policy A is exclusive, at 553, the method 545 can include determining if policy B is exclusive also. If policy B is also exclusive, at 555, the method 545 can include determining if policy A has a greater priority than policy B. If policy A has a greater priority than policy B, then the actions associated with policy A are applied to the network traffic, and the policy B actions are ignored. If, at 555, it is determined that policy A does not have a greater priority than policy B, then the method 545 can include determining, at 552, if the application associated with policy A has a priority equal to the application associated with policy B.

Similarly, if at 547 it is determined that policy A is not exclusive, and at 548 it is determined that policy B is exclusive, at 556 the method 545 can include ignoring the actions of policy A and applying the actions of policy B.

At 549, the method 545 can include determining if policy A and policy B are composable. As used herein, a plurality of policies are "composable" if they can be combined such that both policies can be enforced. In such examples, the system 100 illustrated in FIG. 1 can include a composition engine (not illustrated), and the computing device 208 illustrated in FIG. 2 can include a composition module (not illustrated) to compose a plurality of network policies. If it is determined that policy A and policy B are composable, at 554, the method 545 can include composing policy A and policy B and applying both.

If it is determined that policy A and policy B are not composable, at 550, the method 545 can include determining if the action associated with policy A is equal to precedence to the action associated with policy B. As used herein, the precedence of an action can refer to the relative importance of an action. If the action precedence of policy A is not equal to the action precedence of policy B, at 557 the method 545 can include determining if the action associated with policy A has a greater precedence than the action associated with policy B. If the action associated with policy A has a greater precedence than the action associated with policy B, the method 545 includes applying the policy A actions and ignoring the policy B actions at 558. Alternatively, if the action associated with policy A does not have a greater precedence than the action associated with policy B, the method 545 includes applying the policy B actions and ignoring the policy A actions at 556.

If it is determined that the actions associate with policy A and policy B have equal precedence, at 551 the method 545 can include determining if the application which generated policy A has a greater priority than the application which generated policy B. As discussed herein, an administrator of the network (e.g., SDN 330 illustrated in FIG. 3) can assign a priority, or importance, to each application within the network. If it is determined that the application associated with policy A has a greater priority than the application associated with policy B, then the method 545 can include applying the actions associated with policy A and ignoring the actions associated with policy B at 558.

Alternatively, if it is determined that the application associated with policy A does not have a greater priority than the application associated with policy B, then at 552 the method 545 can include determining if the application associated with policy A has an equal priority to the application associated with policy B. If it is determined at 552 that the application associated with policy A is equal to the application associated with policy B, then it is assumed that policy A and policy B are from the same application, and at 559 it is determined whether policy A has a greater priority than policy B. If it is determined that policy A has a greater priority than policy B, the actions associated with policy A can be applied and the actions associated with policy B can be ignored. Alternatively, if it is determined that policy A does not have a greater priority than policy B, the actions associated with policy B can be applied and the actions associated with policy A can be ignored.

Figure 6:
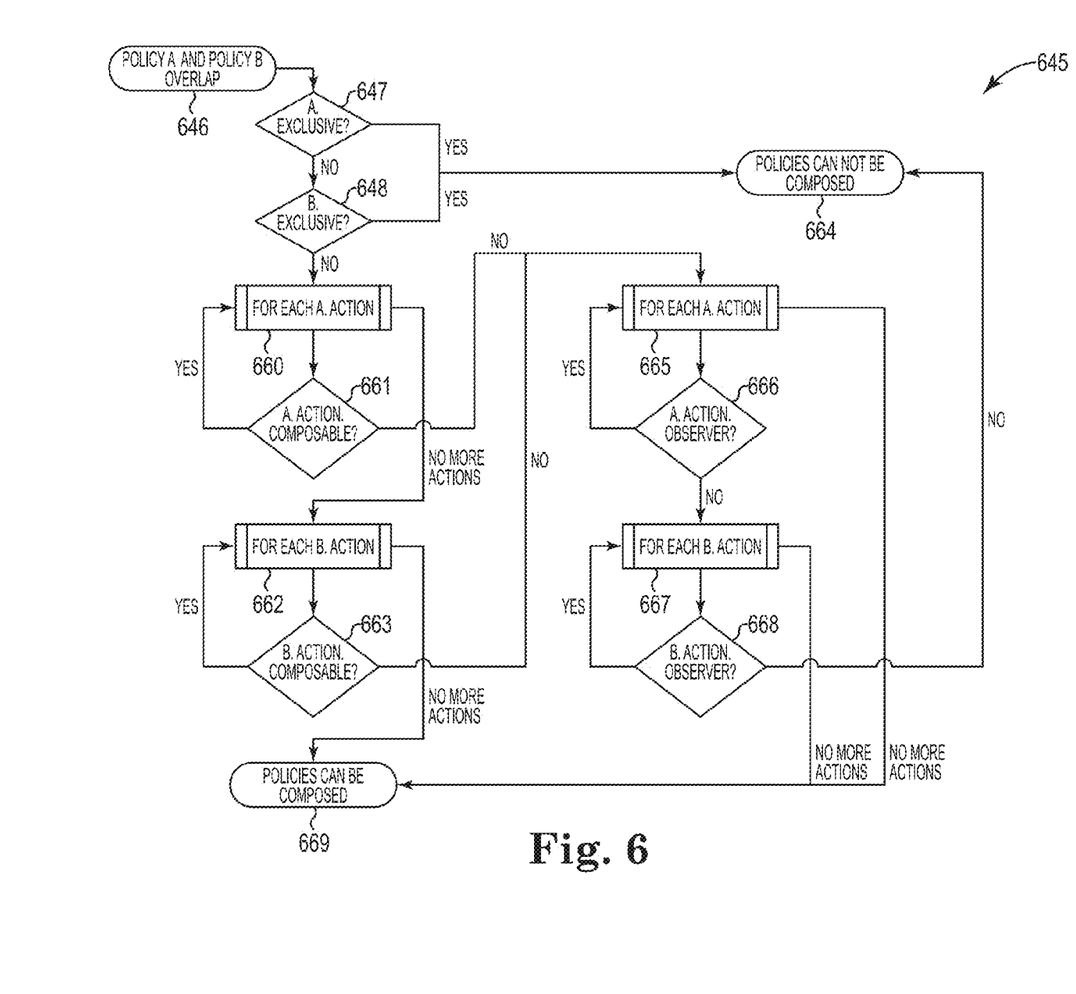
FIG. 6 illustrates a flow chart of an example method for network policy conflict detection and resolution according to the present disclosure.

FIG. 6 illustrates a flow chart of an example method 645 for network policy conflict detection and resolution, according to the present disclosure. Specifically, FIG. 6 illustrates a method for determining if two overlapping policies, such as policies 440-1 and 440-2 illustrated in FIG. 4, are composable as discussed in relation to FIG. 5. At 646 the method 645 can include determining that policy A and policy B overlap. Similarly, at 647, the method 645 can include determining if policy A is exclusive, as discussed in relation to at least FIG. 5. If policy A is exclusive, the method 645 can include determining at 664 that the policies may not be composed. If policy A is not exclusive, the method 645 can include determining if policy B is exclusive at 648. If policy B is exclusive, the method 645 can include determining that the policies may not be composed. If policy B is not exclusive, the method 645 continues.

At 661, the method 645 can include determining for each action associated with policy A, if it is composable. For instance, if policy A includes actions "allow", "audit", and "inspect", then the method may include determining for each of the "allow", "audit", and "inspect" actions, whether they could be composed with other actions. If it is determined that at least one of the actions associated with policy A is not composable, then at 666 the method 645 can include determining for each action associated with policy A, if it is an observer. If it is determined that at least one of the actions associated with policy A is not an observer, then the method 645 can continue to 667, where it can be determined for each action associated with policy B, if it is an observer, at 668.

If it is determined that the actions associated with policy A are composable, the method 645 continues. At 662, the method 645 can include determining for each action associated with policy B, whether the actions are composable. If it is determined that at least one of the actions associated with policy B is not composable, then at 667 the method 645 can include determining for each action associated with policy B, if it is an observer. If it is determined that at least one of the actions associated with policy B is not an observer, then at 664 the method 645 can include determining that the policies cannot be composed.

Similarly, if it is determined that actions associated with policy A and policy B are both composable, then at 669 the method 645 can include determining that the policies can be composed. Further, if the actions associate with policy A are not composable, but the actions associate with policy B are observers, then at 669 the method 645 can include determining that the policies can be composed.

Figure 7:
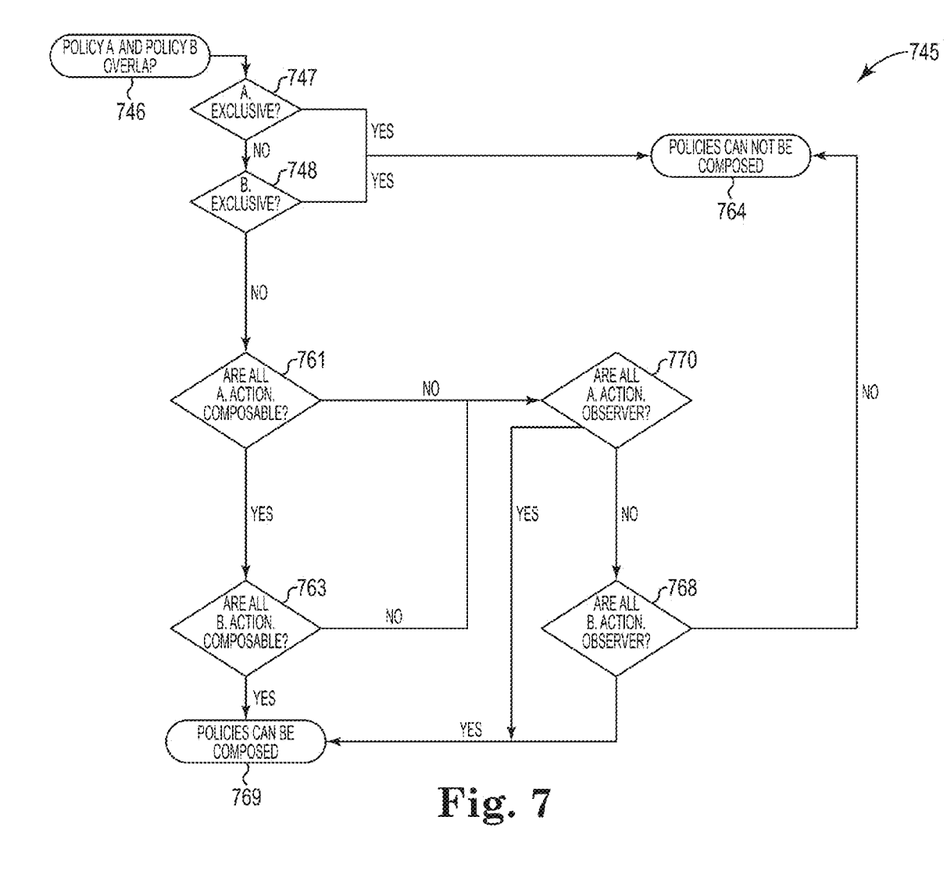
FIG. 7 illustrates a flow chart of an example method for network policy conflict detection and resolution according to the present disclosure.

FIG. 7 further illustrates an example method 745 for network policy conflict detection and resolution according to the present disclosure. As described in relation to FIGS. 5 and 6, the method 745 can include determining that policy A and policy B overlap, at 746. Similarly, at 747 and 748, it can be determined if either policy A or policy B are exclusive. If either policy is exclusive, the method 745 can include determining at 764 that the policies cannot be composed. If neither policy A nor policy B are exclusive, then at 761 the method 745 can include determining if all actions associated with policy A are composable. If all actions associate with policy A are not composable, the method 745 includes determining at 770 if all of the actions associated with policy A are observers. If all actions associated with policy A are not observers, then at 768 the method 745 can include determining if all actions associated with policy B are observers. If all actions associated with policy B are not observers, then the method 745 can include determining at 764 that the policies cannot be composed. If at 768 it is determined that all actions associated with policy B are observers, then at 769 the method 745 can include determining that policy A and policy B are composable. However, if at 770 it is determined that all of the actions associated with policy A are observers, then the method 745 can include determining at 769 that the policies can be composed.

Figure 8:
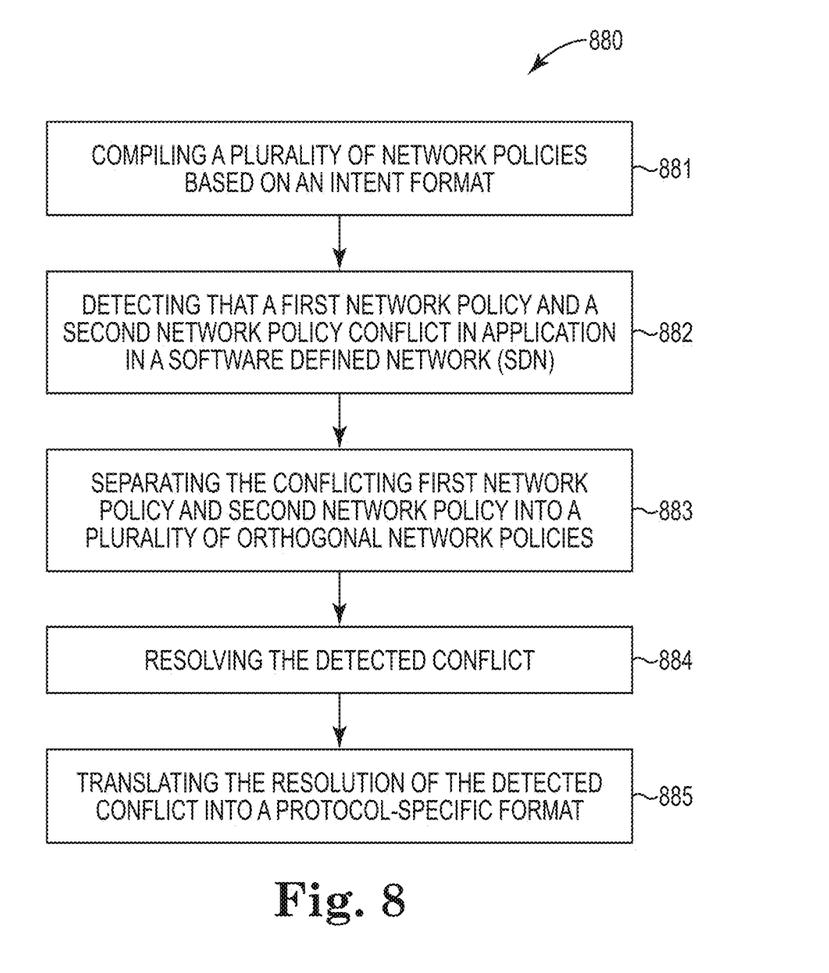
FIG. 8 illustrates a flow chart of an example method for network policy conflict detection and resolution according to the present disclosure.

FIG. 8 illustrates a flow chart of an example method 880 for network policy conflict detection and resolution according to the present disclosure. The example method illustrated in FIG. 8 can be implemented in the environment 320 illustrated in FIG. 3, using the system 100 illustrated in FIG. 1 and/or the computing device 208 illustrated in FIG. 2.

At 881, the method 880 can include compiling a plurality of network policies based on an intent format. As discussed in relation to FIG. 1, the intent format can include a classifier, a context, a source endpoint identifier, and a destination endpoint identifier for each network policy among the plurality of network policies.

At 882, the method 880 can include detecting that a first network policy and a second network policy conflict in application within an SDN, based on the intent format. For instance, as discussed in relation to FIGS. 1, 2, 3, and 4, a plurality of policies may each apply to the same destination endpoint identifier, such as VLAN 5.

At 883, the method 880 can include separating the conflicting first network policy and second network policy into a plurality of orthogonal network policies. As described in relation to FIG. 4, each orthogonal network policy can have a different policy space, which determines which portions of network traffic to which the policy applies.

At 884, the method 880 can include resolving the detected conflict between the first network policy and the second network policy using the plurality of network policies. For instance, the conflicting network policies can be separated into orthogonal policies, and each orthogonal network policy can proceed through the flow charts illustrated in FIGS. 5, 6, and 7 to determine which policy to apply, and how.

At 885, the method 880 can include translating the resolution of the detected conflict into a protocol-specific format for distribution to devices within the SDN. In some examples, the method 880 can include marking the translation of the detected conflict with an identifier to an orthogonal network policy from which the protocol-specific message originated, as discussed in relation to FIGS. 1 and 2.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "P", and "R", particularly with respect to reference numerals in the drawings, indicate that a number of the particular feature and/or component so designated can be included with a number of examples of the present disclosure. The designators "N", "P", and "R" can refer to a same feature and/or component, or different features and/or components.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
   a policy compilation engine to compile a plurality of network policies based on an intent format, wherein the intent format specifies a classifier for network traffic, a context of the network traffic, an action of the network traffic, a source endpoint identifier for the network traffic and a destination endpoint identifier for the network traffic;
   a policy optimization engine to optimize the plurality of network policies by removing any network policies from the plurality of network policies that lacks a destination endpoint identifier or a source endpoint identifier;
   a conflict detection engine to detect a conflict between a first network policy among the plurality of network policies and a second network policy among the plurality of network policies, using the intent format;

a conflict resolution engine to resolve the detected conflict between the first network policy and the second network policy; and a translation engine to translate the resolution of the detected conflict to a protocol-specific format.

2. The system of claim 1, further comprising the conflict detection engine to compare a first policy space for the first network policy against a second policy space for the second network policy and determine if the first policy space and the second policy space overlap.

3. The system of claim 1, further comprising the conflict detection engine to compare a first policy space for the first network policy against each of the plurality of network policies to identify overlapping policies among the plurality of network policies.

4. The system of claim 1, further comprising the conflict resolution engine to resolve the detected conflict by reducing the detected conflict into a plurality of orthogonal derived policies.

5. The system of claim 1, further including a policy optimization engine to optimize the plurality of network policies by generating a default network policy and removing any network policies from the plurality of network policies that match an action associated with the default network policy.

6. A non-transitory computer readable medium storing instructions executable by a processing resource to cause a computer to:

compile a plurality of network policies based on an intent format, wherein the intent format specifies a classifier for network traffic, a context of the network traffic, an action of the network traffic, a source endpoint identifier for the network traffic and a destination endpoint identifier for the network traffic;

optimize the plurality of network policies by removing any network policies from the plurality of network policies that lacks a destination endpoint identifier or a source endpoint identifier;

detect an overlap in application between a first network policy among the plurality of network policies and a second network policy among the plurality of network policies, using the intent format;

separate the overlapping first network policy and second network policy into a plurality of orthogonal policies; and resolve the detected overlap between the first network policy and the second network policy, based on the plurality of orthogonal policies.

7. The medium of claim 6, wherein each of the plurality of orthogonal policies is a network policy selected from the group consisting of:

a first orthogonal network policy from a non-overlapping portion of the first network policy;

a second orthogonal network policy from a non-overlapping portion of the second network policy; and a third orthogonal network policy from the overlap in application between the first network policy and the second network policy.

8. The medium of claim 6, wherein:

each network policy among the plurality of network policies is generated by a respective application in a software-defined network (SDN); and each network policy among the plurality of network policies has a priority assigned to it by the respective application.

9. The medium of claim 8, further including instructions to resolve a conflict between the first network policy and the second network policy by comparing the priority assigned to the first network policy and the priority assigned to the second network policy.

10. A method, comprising:

compiling a plurality of network policies based on an intent format, wherein the intent format includes a classifier, a context, a source endpoint identifier, and a destination endpoint identifier for each network policy among the plurality of network policies;

optimizing the plurality of network policies by removing any network policies from the plurality of network policies that lacks a destination endpoint identifier or a source endpoint identifier;

detecting that a first network policy and a second network policy conflict in application within a software defined network (SDN), based on the intent format;

separating the conflicting first network policy and second network policy into a plurality of orthogonal network policies;

resolving the detected conflict between the first network policy and the second network policy using the plurality of orthogonal network policies; and translating the resolution of the detected conflict into a protocol-specific format for distribution to devices within the SDN.

11. The method of claim 10, further including marking the translation of the detected conflict with an identifier to identifying an orthogonal network policy among the plurality of orthogonal network policies from which the protocol specific message originated.

* * * * *